E. E. NORTON.
TALKING MACHINE.
APPLICATION FILED APR. 1, 1909.
1,095,225.
Patented May 5, 1914.
4 SHEETS—SHEET 1.
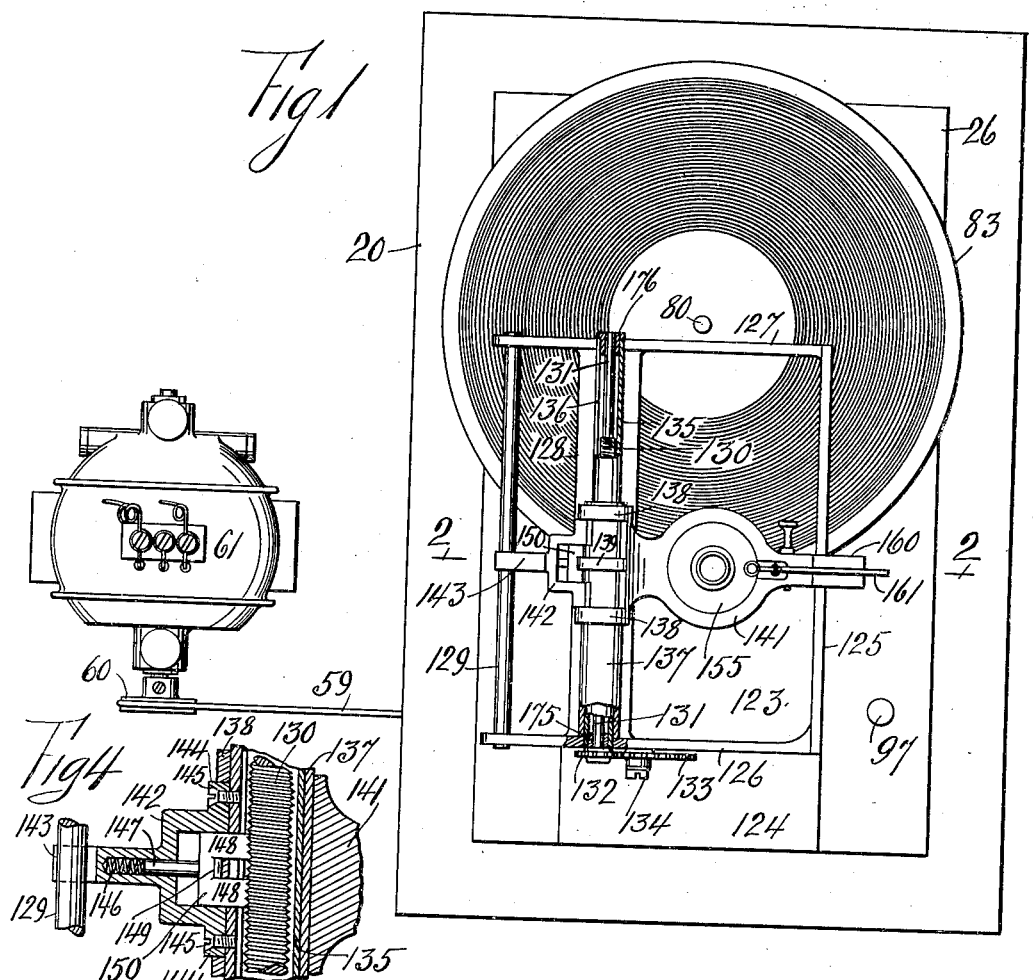
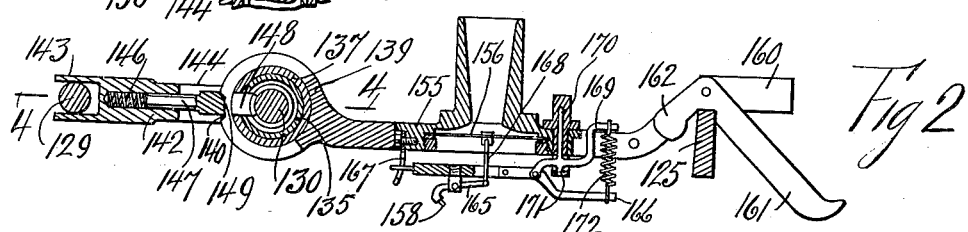
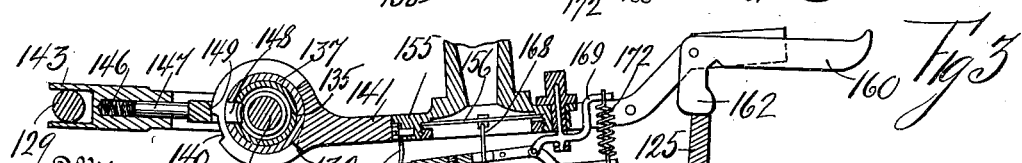
Witnesses
Martin Zimansky
John J. Millin
Inventor
Eugene Earl Norton
By his Attorney
Art de Bonneville

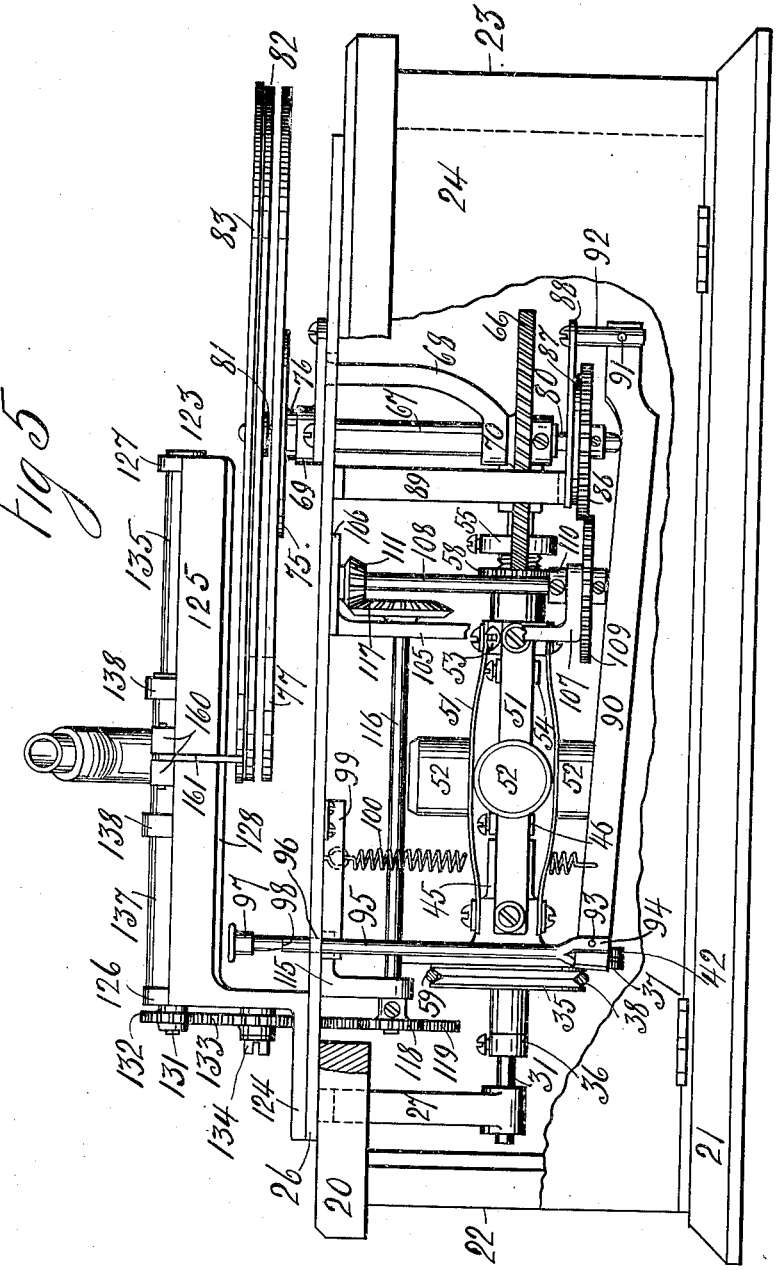

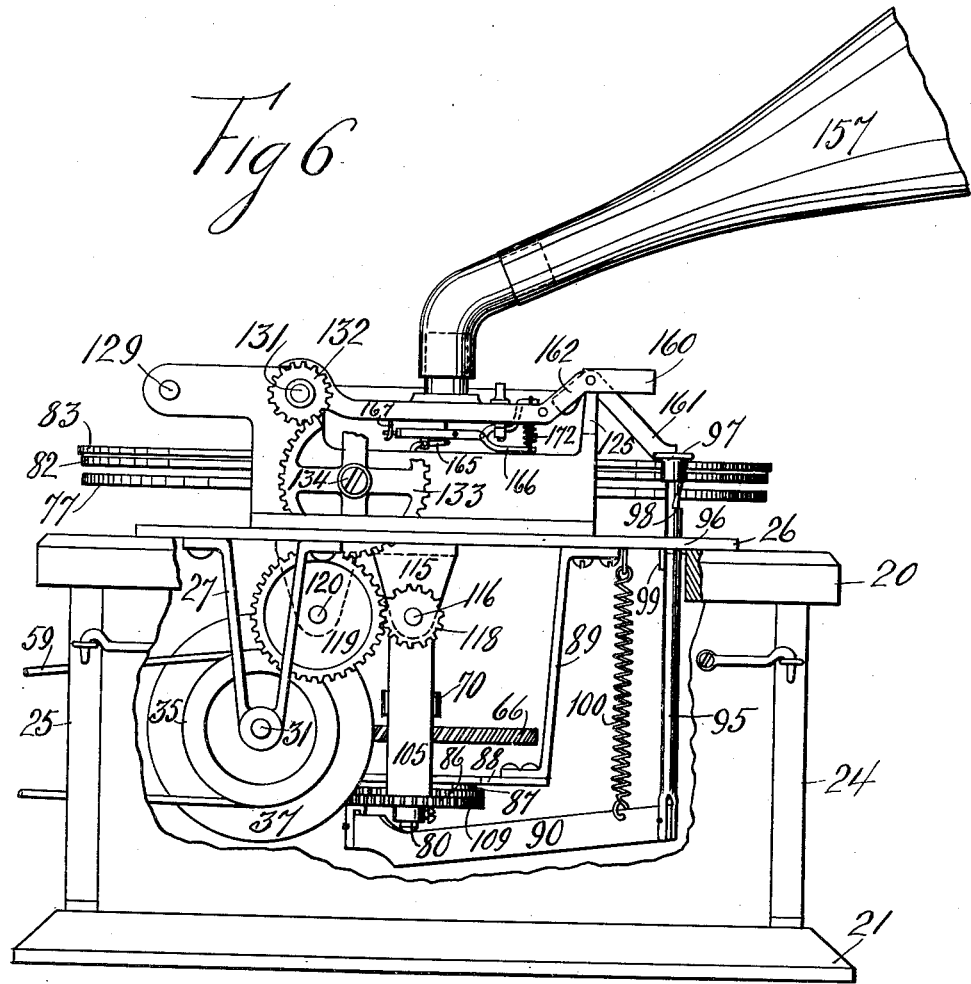

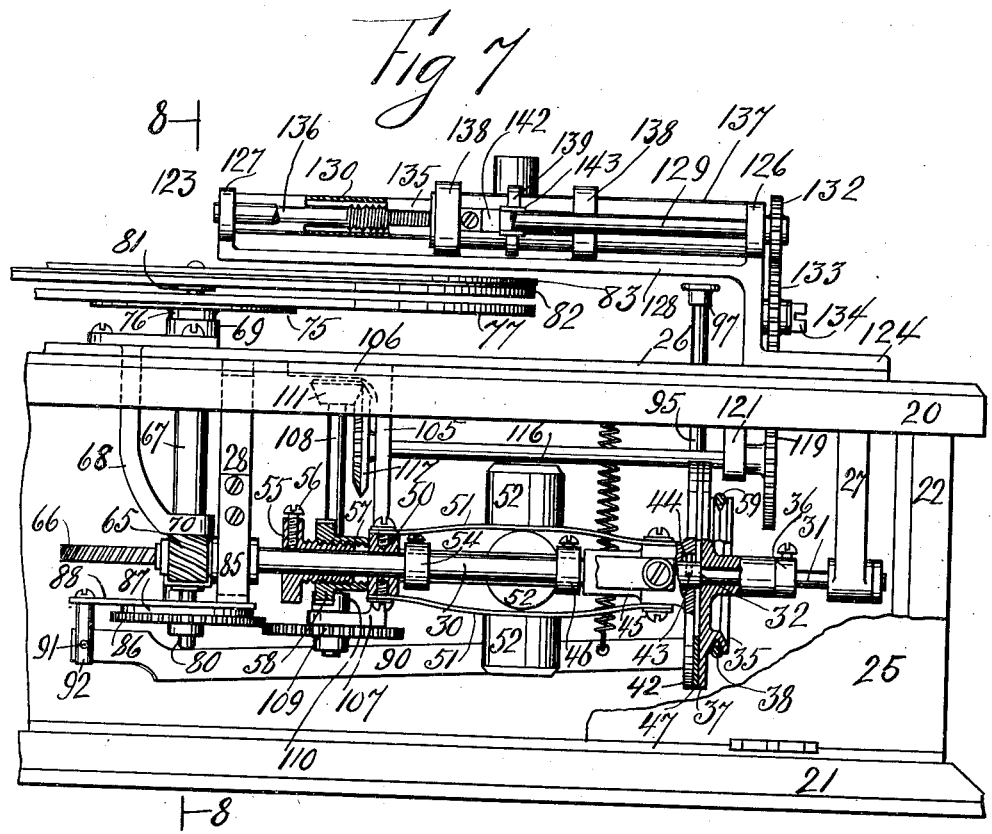
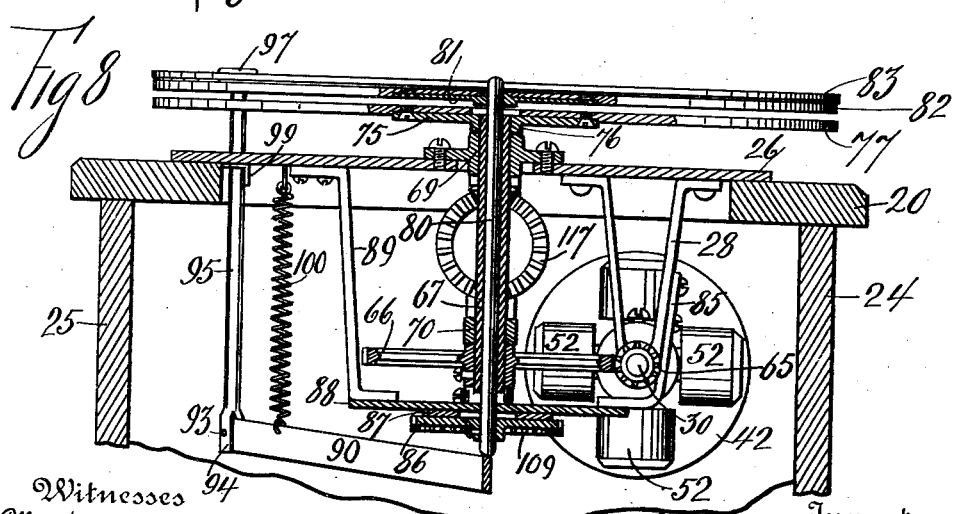

UNITED STATES PATENT OFFICE.

EUGENE EARL NORTON, OF BRIDGEPORT, CONNECTICUT, ASSIGNOR TO JAMES ALBERT WHITMAN, OF NEW YORK, N. Y.

TALKING-MACHINE.

1,095,225.	Specification of Letters Patent.	Patented May 5, 1914.

Application filed April 1, 1909. Serial No. 487,334.

*To all whom it may concern:*

Be it known that I, EUGENE EARL NORTON, a citizen of the United States, and resident of Bridgeport, in the county of Fairfield and State of Connecticut, have invented certain new and useful Improvements in Talking-Machines, of which the following is a specification.

This invention relates to talking machines and especially to propelling devices for the sound boxes thereof.

The invention is distinguished by a propelling device for disk records, having up and down cuts. The records are distinguished from the zig zag records where the variations are in horizontal planes, while the records for which this invention is applicable have surfaces inclined to horizontal planes. The sounds with this device are produced by the contact of the needle point with said inclined surfaces, and the mechanism of the invention propels the point across the horizontal plane of the records.

The invention also relates to means for rotating and instantly starting or stopping the disk carrying the disk record.

In the accompanying drawings, Figure 1 shows a top plan view of the invention, Fig. 2 represents an enlarged partial section of Fig. 1 on the line 2, 2, Fig. 3 is similar to Fig. 2 with some of the elements in a changed position, Fig. 4 is a partial section as on the line 4, 4 of Fig. 2, Fig. 5 is an enlarged right hand view of Fig. 1 with a portion of its case broken away, Fig. 6 shows a left hand view of Fig. 5, Fig. 7 represents a left hand view of Fig. 6 with the case broken away, and Fig. 8 shows a section of Fig. 7 on the line 8, 8.

The talking machine is represented with a casing comprising the top 20, bottom 21, side walls 22, 23, hinged front door 24 and hinged rear door 25. A frame plate 26 is fastened to the top 20 of the casing, and from which extend into said casing the journal brackets 27, 28. A governor with its driven shaft comprising the portions 30 and 31, shouldered at 32 is journaled in said brackets 27, 28. A driving pulley 35 is journaled on the portion 31 of the said shaft with one end thereof laterally bearing against the shoulder 32, and the other end against a collar 36 fastened to the portion 31. The said pulley has formed therewith a friction disk 37 and the V groove 38. An accompanying sleeve friction disk 42 is longitudinally supported on the portion 30 of said driving shaft. A pin 43 extends from the portion 30 and engages a cavity 44 in the said disk 42. The sleeve 45 of the disk 42 extends to within a short distance of an adjustable collar 46 on the portion 30. An annular disk 47 preferably of fiber is fastened to the face of the disk 42.

An adjustable collar 50 is carried on the portion 30 and flexible bands 51 having the weights 52 connect it with the sleeve 45. A screw 53 can secure the adjustable collar 50 to the portion 30 in different positions. An adjustable collar 54 is located on the portion 30 within a short distance of the collar 50. A threaded stop sleeve 55 is fastened to the portion 30 by means of the screw 56, and is in threaded engagement with the adjustable stop 57 having the knurled flange 58. A belt 59 connects the pulley 35 with the pulley 60 of the electric motor 61.

On the portion 30 of the driving shaft and bearing against the outside face of the journal bracket 28 is fastened the spiral gear 65, the teeth of which mesh with the teeth of the spiral gear 66 fastened to the sleeve 67.

From the frame plate 26 extends the journal bracket 68 with the upper bearing 69 and the lower bearing 70, and the sleeve 67 is journaled in said bearings. At the upper end of the sleeve 67 is fastened the disk 75, the lower edge of the hub 76 of which bears on the upper edge of the bearing 69. A friction disk 77 is carried and fastened to the disk 75. A spindle 80 is located within the sleeve 67. A disk 81 is fastened to the spindle 80 which carries the friction disk 82, and on the upper face of the latter is secured a cloth cover in the usual way for the disk record 83. The lower face of the disk 82 with the upper face of the disk 77 constitutes a record friction clutch or brake. A spur gear 86 is fastened to the spindle 80 and carries on its upper face the annular friction ring 87, which latter is in the path of the stationary friction plate 88 carried on the brackets 89 and 85, extending respectively from the plate 26 and the bracket 28. The lower end of the spindle 80 is adjustably carried on the lever 90. The said lever 90 is fulcrumed on a pin 91 fastened to the bifurcated lug 92 extending from friction plate 88. The swinging end of the lever 90 is pinned, by means of the pin 93 in the forked end 94 of the adjusting rod 95. The latter is guided through an opening 96 in the frame plate 26 and has formed at its upper end the cap 97. The rod 95 is notched to form a stop 98 that can engage with the lower face of the frame plate 26. A spring 99 is fastened to the lower face of the frame plate 26 and bears against the upper end of the adjusting rod 95, to maintain the stop 98 in engagement with the plate 26 when so located by the operator. A spring 100 extends between the plate 26 and the lever 90 to cause the said lever to bear up against the spindle 80, to separate the friction disk 82 from the friction disk 77.

A bracket 105 is fastened to the frame plate 26 and has formed therewith the upper leg 106 and the lower leg 107. A vertical shaft 108 is journaled in said legs and has fastened to its lower end the spur gear 109, the teeth of which mesh with the teeth of the spur gear 86 on the spindle 80. A collar 110 on the vertical shaft 108 prevents the longitudinal displacement of the latter, and a bevel pinion 111 is carried on the upper end of said vertical shaft 108. A journal bracket 115 extends from the plate 26, and a horizontal shaft 116 has one end journaled in the bracket 105 and the other end in the bracket 115. A bevel gear 117 on the shaft 116 gears with the bevel gear 111. A pinion 118 is carried on the shaft 116 and its teeth mesh with the teeth of a spur gear 119 journaled on a pin 120 fastened to the bracket 121 extending from the frame plate 26.

On top of the frame plate 26 is supported the U shaped frame 123 with the foot 124, front wall 125, side walls 126, 127, tie bar 128 and guide rod 129. A screw 130 has one of its cylindrical ends 131 journaled in a collar 175 carried in the sleeve 135 and the other end in a plug 176 secured in the other end of said sleeve. A pinion 132 is fastened to one of the ends 131 and its teeth mesh with the teeth of a spur gear 133 journaled on a pin 134 extending from the wall 126.
The teeth of the gear 133 mesh with the teeth of the gear 119. A sleeve 135 with a longitudinal slot 136 surrounds the screw 130. An outer sleeve 137 is slidably supported on the sleeve 135. The outer sleeve 137 carries the ring supports 138, and the ring support 139 having the notch 140 of the sound box frame 141.

A supporting bracket 142 with the forked arm 143 and legs 144 is fastened to the outer sleeve 137 by means of the screws 145, the legs 144 bearing against the ring supports 138. The forked arm 143 straddles the guide rod 129. A cavity in the arm 143 supports the spring 146, which bears against a spindle 147, guided in said arm and extending from an engaging bracket 150 with the threaded legs 148, which gage with the threads of the screw 130. A wall 149 somewhat beveled of said engaging bracket is located in the path of the notch 140 of the ring support 139 to disengage the threaded legs 148 from the screw 130.

The sound box frame 141 carries the housing 155 of the sound box having the diaphragm 156, horn 157, and needle point
158. The needle point 158 is carried by a spring reproducer comprising a lever 165 pivoted to the spring lever 166, one end of which latter is guided in a ring 167 in the usual way. The lever 165 is pivoted to the link 168 that connects with the diaphragm 156. The spring lever 166 is pivoted to the oscillating arm 169, having the upper pin 170 and lower pin 171 in the usual way, and a spring 172 extends between the end of the arm 169 and the accompanying end of the spring lever 166. A bifurcated leg 160 extends from the frame 141 and which can bear on the front wall 125 of the U shaped frame 123. An operating lever with the legs 161 and 162 is pivoted in the leg 160. The leg 162 can be made to bear on the top edge of the front wall 125 by raising the leg 161, by virtue of which the needle point 158 is brought out of the path of the disk record 83.

To operate the invention, the disk record 83 having been located on the friction disk 82, the motor 61 is started to impart rotation to the pulley 35. The friction disks 37 and 42 transmit rotation to the portion 30 of the driving shaft of the governor. The said governor is fully described in my patent applications filed October 13, 1908, Serial Number 457,469 and December 9, 1908, Serial Number 466,627.

The spiral gear 65 rotates with portion 30 of the driving shaft and turns the spiral gear 66 on the sleeve 67, by virtue of which the friction disk 77 is turned. The operator next bears down on the cap 97 of the adjusting rod 95 to cause the stop 98 to lock with frame plate 26, and thereby the lever 90 in swinging down on the pin 91, carries with it the spindle 80. When the spindle 80 is lowered it carries with it the friction disk 82, to make contact with the friction disk 77, and thereby rotation is transmitted from the disk 77 to the disk 82 and its spindle 80. With the lowering of the spindle 80 the friction disk 87 is disengaged from the stationary plate 88 releasing the said spindle 80. The spindle 80 through the gears 86 and 109 transmits rotation to the vertical shaft 108. The bevel pinion 111 on the shaft 108 transmits rotation to the horizontal shaft 116 through the bevel gear 117. Rotation from the shaft 116 is transmitted to the screw 130 by means of the interposed gearing.

The screw 130 rotating, and the leg 162 of the operating lever being located on the top edge of the front wall 125 of the U shaped frame 123, the needle point 158 is maintained out of the path of the disk record 83. The threaded legs 148 are also maintained out of engagement with the said screw 130, as shown in Fig. 3, by reason of the wall 149 of the bracket having the legs 148 bearing against the ring support 139.

Next the operator disengages the leg 162 of the operating lever from the front wall 125 and the needle point 158 contacts with the grooves of the record 83, the notch 140 of the ring support 139 allowing the spring 146 to push forward the bracket 150, so that its threaded legs 148 engage with the screw 130, by virtue of which the sound box with its appurtenances is driven in a straight line over the disk record.

To stop the talking machine for the purpose of inserting a new disk record, the operator, disengages the stop 98 of the rod 95 from the frame plate 26. The lever 90 is then raised by the tension of the spring 100 and causes the spindle 80 to rise, by virtue of which the friction disk 87 comes in the path of the stationary plate 88, which stops the spindle 80 carrying the record 83, and also disengages the friction disks 77 and 82, the latter carrying the disk record. The elements 87 and 88 constitute a brake for the spindle 80. It will be noted that the friction disk 77 continues turning while the motor 61 is in operation, and that the friction disk 77 transmits motion to the friction disk 82, and that full speed is given to the disk 82 as soon as contact is made between it and the said disk 77.

Having described my invention what I desire to secure by Letters Patent and claim is:

1. In a talking machine the combination of a governor, a shaft for said governor, means to rotate said shaft through the intervention of the governor, a sleeve, connections between the said sleeve and said shaft, a friction disk connected to said sleeve, a spindle within the sleeve, a second friction disk for a disk record connected to said spindle located so that it can bear against the first friction disk, and means to bring the friction disks in contact with each other.

2. In a talking machine the combination of a governor, a shaft for said governor, means to rotate said shaft through the intervention of the governor, a sleeve, connections between the said sleeve and said shaft, a friction disk connected to said sleeve, a spindle within the sleeve, a second friction disk for a disk record connected to said spindle located so that it can bear against the first friction disk, a brake connected up with the spindle, and means to bring the friction disks in contact with each other.

3. In a talking machine the combination of a rotative sleeve, a friction disk connected with said sleeve, a spindle within the sleeve, a second friction disk for a disk record connected to said spindle, a lever bearing up against said spindle, means to move the lever to bring the friction disks in contact with each other.

4. In a talking machine the combination of a rotative sleeve, a friction disk connected to the sleeve, a spindle within the sleeve, a second friction disk for a disk record connected to the spindle, a lever in the path of the lower end of said spindle, an adjusting rod for the lever and a friction ring connected up with the spindle in the path of a friction plate.

5. In a talking machine the combination of a rotative sleeve, a friction disk connected to the sleeve, a spindle within the sleeve, a second friction disk for a disk record connected to the spindle, a lever in the path of the lower end of said spindle, an adjusting rod for the lever, a friction ring connected up with the spindle in the path of a friction plate, a screw journaled in the machine, a sound box for the machine, means between the screw and sound box to propel the latter and gearing interposed between the said spindle and said screw to rotate the latter.

6. In a talking machine the combination of a governor, a driven shaft of the governor maintained at a uniform speed of rotation, a gear on said shaft, a sleeve journaled in the machine, a gear on the sleeve with its teeth meshing with the teeth of the gear on the driven shaft, a friction disk connected with the sleeve, a spindle within the sleeve, a friction disk connected with the spindle, adapted to carry a disk record, a brake connected with the spindle, a second gear on the spindle, a screw with its ends journaled in the machine, connections between said screw and the second gear on said spindle, a sound box in adjustable engagement with said screw, a needle point connected with the sound box in the path of the disk record, a lever bearing up against the lower end of said spindle pivoted in the machine to vertically move the spindle to actuate and move the friction disk of the spindle relatively to the friction disk of said sleeve.

7. In a talking machine the combination of a rotative sleeve, a friction disk connected to the sleeve, a spindle within the sleeve, a second friction disk for a disk record connected to the spindle, the two friction disks constituting a clutch, and a second clutch connected to the spindle, one of the said clutches performing its function while the other is inoperative.

Signed at the borough of Manhattan in the county of New York and State of New York this 29th day of March A. D. 1909.

ENGENE EARL NORTON.

Witnesses:
MARTIN ZIMANSKY,
M. H. COOK.